US012593854B2

(12) United States Patent
Sawaragi et al.

(10) Patent No.: US 12,593,854 B2
(45) Date of Patent: Apr. 7, 2026

(54) METHOD FOR STABILIZING OIL OR FAT COMPOSITION FOR FRYING USE

(71) Applicant: J -OIL MILLS, INC., Tokyo (JP)

(72) Inventors: Yosuke Sawaragi, Tokyo (JP); Ryuji Hori, Tokyo (JP); Masayoshi Sakaino, Tokyo (JP); Naruto Makita, Tokyo (JP); Hisashi Arai, Tokyo (JP); Shigeo Takeuchi, Tokyo (JP)

(73) Assignee: J-OIL MILLS, INC., Tokyo (JP)

( * ) Notice: Subject to any disclaimer, the term of this patent is extended or adjusted under 35 U.S.C. 154(b) by 826 days.

(21) Appl. No.: 16/964,623

(22) PCT Filed: Jan. 21, 2019

(86) PCT No.: PCT/JP2019/001619
§ 371 (c)(1),
(2) Date: Jul. 24, 2020

(87) PCT Pub. No.: WO2019/151009
PCT Pub. Date: Aug. 8, 2019

(65) Prior Publication Data
US 2021/0051971 A1 Feb. 25, 2021

(30) Foreign Application Priority Data

Jan. 31, 2018 (JP) ................................ 2018-015954

(51) Int. Cl.
| | |
|---|---|
| *A23B 20/30* | (2025.01) |
| *A23D 9/007* | (2006.01) |
| *A23L 5/10* | (2016.01) |
| *A23L 5/46* | (2016.01) |
| *C11B 5/00* | (2006.01) |

(52) U.S. Cl.
CPC .............. *A23B 20/30* (2025.01); *A23D 9/007* (2013.01); *A23L 5/11* (2016.08); *A23L 5/46* (2016.08); *C11B 5/0085* (2013.01); *A23V 2002/00* (2013.01)

(58) Field of Classification Search
CPC .. A23D 9/06; A23D 9/007; A23L 5/46; A23L 5/11; C11B 5/0085
See application file for complete search history.

(56) References Cited

U.S. PATENT DOCUMENTS

2011/0059222 A1 3/2011 Yamada et al.

FOREIGN PATENT DOCUMENTS

WO WO-2004108869 A1 * 12/2004 ............... A23D 9/00
WO WO-2013160372 A1 * 10/2013 ............. A23L 1/277

OTHER PUBLICATIONS

"Action of Chlorophylls on the Stability of Virgin Olive Oil"; Gutierrez et al.; JAOCS, vol. 69 No. 9 pp. 866-870, Sep. 1992; download date Aug. 24, 2023; pp. 1-6. (Year: 1992).*
Beck, Leslie; https://www.theglobeandmail.com/life/health-and-fitness/health/smoke-point-matters-in-cooking-with-oil/article26569-060/; The Globe and Mail; Sep. 28, 2015; download date Jan. 24, 2024; pp. 1-8 (Year: 2015).*
https://socratic.org/organic-chemistry-1/alkene-and-alkyne-addition-reactions/hydrogenation; Organic Chemistry; "Hydrogenation"; 4 pages; NPL date Nov. 2014; download date May 18, 2024; (Year: 2014).*
Abraham et al., "Hydrogenation of Canola Oil as Affected by Chlorophyll", JAOCS, 1986, vol. 63, No. 9, pp. 1185-1188.
International Search Report (ISR) dated Mar. 5, 2019 filed in PCT/JP2019/001619.

* cited by examiner

*Primary Examiner* — Steven N Leff
(74) *Attorney, Agent, or Firm* — RANKIN, HILL & CLARK LLP

(57) ABSTRACT

[Problem] To provide: a method for improving the stability of an oil or fat composition for frying use by preventing the coloration of the oil or fat composition and also preventing the increase in an anisidine value and the decrease in the content of a tocopherol compound in the oil or fat composition when a food material is fried with the oil or fat composition; and a stabilizer for an oil or fat composition for frying use.
[Solution] A method for stabilizing an oil or fat composition for frying use according to the present invention is characterized in that a chlorophyll compound is added at a concentration of 0.05 to 2 ppm by mass inclusive to an edible oil or fat. It is preferred that the chlorophyll compound is added in the form of a chlorophyll compound-rich solution having a chlorophyll compound concentration of 1 to 1,000 ppm by mass inclusive. A stabilizer for an oil or fat composition for frying use according to the present invention contains a chlorophyll compound as an active ingredient.

8 Claims, No Drawings

METHOD FOR STABILIZING OIL OR FAT COMPOSITION FOR FRYING USE

TECHNICAL FIELD

The present invention relates to a method for stabilizing a frying oil or fat composition, more specifically a method for stabilizing the frying oil or fat composition by suppressing coloration of the oil or fat composition, increase in an anisidine value, and decrease in an amount of tocopherols when a foodstuff is fried with the frying oil or fat composition.

BACKGROUND ART

When frying a foodstuff using an edible oil or fat such as soybean oil and rapeseed oil, the color tone of the edible oil or fat is changed by influences of heating operation, and oxygen and water in the foodstuff and atmosphere. As the color tone of the edible oil or fat changes, a quality of a fried food deteriorates, so that the edible oil or fat cannot be used for a long time.

As a prior art for suppressing heat coloration in frying a foodstuff with an edible oil or fat, Patent Document 1 proposes a method for improving heat resistance of a frying oil or fat composition by adding a pressed oil and/or extracted oil, and a phosphorus-derived component such as degummed oil to a refined edible oil or fat. According to the invention in Patent Document 1, it is possible to improve heat stability of the frying oil or fat composition, particularly to suppress heat coloration and cooked odor.

An anisidine value is a numerical value indicating a content of an aldehyde that is produced as oxidation of an oil or fat progresses, and is one of indicators for deterioration of the oil or fat. Suppression of increase in the anisidine value of the oil or fat during frying is considered to be effective for suppressing deterioration of a frying oil or fat composition.

A large amount of tocopherols naturally contained in an oil feedstock remain in a refined oil or fat. The tocopherols in the refined oil or fat disappear by heating or the like. Since tocopherols have an antioxidative action on edible oils or fats, suppression of decrease in an amount of tocopherols in an edible oil or fat during frying is considered to be effective for suppressing deterioration of the frying oil or fat composition.

PRIOR ART DOCUMENTS

Patent Documents

Patent Document 1: Japanese Patent Application Laid-Open No. 2009-050234 (Method for Producing an Oil and Fat Composition for Deep-Fried Food Having Excellent Heat Resistance)

SUMMARY OF INVENTION

Problem to be Solved

An object of the present invention is to provide a method for suppressing coloration of a frying oil or fat composition during frying in a different manner from the method using the phosphorus content in Patent Document 1.

The invention in Patent Document 1 is not intended to suppress increase in the anisidine value and decrease in the amount of tocopherols. Thus, an object of the present invention is to provide a method for suppressing increase in the anisidine value and/or decrease in the amount of tocopherols in the frying oil or fat composition during frying.

Solution to Problem

As a result of intensive studies on the above problems, the inventors have found that addition of chlorophylls to an edible oil or fat is effective for suppressing coloration of the edible oil or fat during frying, and this finding has led to completion of the present invention. That means, the present invention provides a method for suppressing coloration of a frying oil or fat composition, wherein chlorophylls are added to an edible oil or fat in an amount of 0.05 ppm by mass or more and 2 ppm by mass or less.

Preferably, the chlorophylls are added as a chlorophyll-rich solution having a chlorophyll concentration of 1 ppm by mass or more and 1,000 ppm by mass or less.

Preferably, the edible oil or fat contains at least one selected from, for example, soybean oil, rapeseed oil, palm-based oil or fat, corn oil, sunflower oil, olive oil, cottonseed oil, rice bran oil, and safflower oil.

Preferably, the chlorophylls contain at least one selected from a chlorophyll a, a pheophytin a, and a pyropheophytin a.

Preferably, the chlorophylls contain the chlorophyll a and the pheophytin a.

Preferably, a mass ratio of the pheophytin a to the chlorophyll a is 0.3 or more and 1.5 or less.

The chlorophylls are derived from algae, for example.

Also, the present invention provides a method for suppressing increase in an anisidine value of a frying oil or fat composition, wherein chlorophylls are added to an edible oil or fat in an amount of 0.05 ppm by mass or more and 2 ppm by mass or less.

Also, the present invention provides a method for suppressing decrease in an amount of tocopherols in a frying oil or fat composition, wherein chlorophylls are added to an edible oil or fat in an amount of 0.05 ppm by mass or more and 2 ppm by mass or less. In this Specification, the tocopherols refer to $\alpha$, $\beta$, $\gamma$ and $\delta$-tocopherol, as well as $\alpha$, $\beta$, $\gamma$ and $\delta$-tocotrienol.

Also, the present invention provides a method for producing a frying oil or fat composition, including a step of adding chlorophylls derived from algae to an edible oil or fat in an amount of 0.05 ppm by mass or more and 2 ppm by mass or less.

Preferably, the chlorophylls are added as a chlorophyll-rich solution having a chlorophyll concentration of 1 ppm by mass or more and 1,000 ppm by mass or less.

Preferably, the chlorophylls contain a chlorophyll a and a pheophytin a.

Preferably, a mass ratio of the pheophytin a to the chlorophyll a is 0.3 or more and 1.5 or less.

Also, the present invention provides a method for producing a fried food, including a step of frying a foodstuff with the frying oil or fat composition obtained by the aforementioned manufacturing method.

Also, the present invention provides a stabilizer for a frying oil or fat composition containing chlorophylls as an active ingredient.

The stabilizer is used particularly for suppressing coloration of the frying oil or fat composition.

The stabilizer is used particularly for suppressing increase in an anisidine value of the frying oil or fat composition.

The stabilizer is used particularly for suppressing decrease in an amount of tocopherols in the frying oil or fat composition.

Effects of Invention

The stabilizer for the frying oil or fat composition and the method for suppressing coloration of the frying oil or fat composition according to the present invention make it possible to significantly suppress coloration of the oil or fat composition compared to a control oil with no chlorophylls even if the frying oil or fat composition is used for frying a foodstuff for as long as 20 hours, for example. This suppression of coloration greatly contributes to life prolongation of the oil or fat composition.

The stabilizer for the frying oil or fat composition and the method for suppressing increase in the anisidine value of the frying oil or fat composition according to the present invention make it possible to significantly suppress the anisidine value of the oil or fat composition to which the chlorophylls are added compared to the anisidine value of a control oil with no chlorophylls even if the frying oil or fat composition is used for frying a foodstuff for a long time. Since the suppression of increase in the anisidine value means suppression of generation of aldehyde which is generated as oxidization of the oil and fat proceeds, the present invention greatly contributes to life prolongation of the frying oil or fat composition.

Also, the stabilizer for the frying oil or fat composition and the method for suppressing decrease in the amount of tocopherols in the frying oil or fat composition according to the present invention make it possible to significantly suppress decrease in the amount of tocopherols in the oil or fat composition to which the chlorophylls are added compared to decrease in the amount of tocopherols in a control oil with no chlorophylls even if the frying oil or fat composition is used for frying a foodstuff for a long time.

DESCRIPTION OF EMBODIMENTS

The method for suppressing coloration of the frying oil or fat composition according to the present invention essentially includes adding chlorophylls to an edible oil or fat. The edible oil or fat serves as a base oil for the frying oil or fat composition. The edible oil or fat is usually a refined oil. Examples of the edible oil or fat include: a vegetable oil or fat such as soybean oil, rapeseed oil, palm oil, palm kernel oil, corn oil, sunflower oil, olive oil, cottonseed oil, safflower oil, linseed oil, sesame oil, rice bran oil, peanut oil, and coconut oil; an animal oil or fat such as lard, beef tallow, chicken fat, and milk fat; medium chain fatty acid triglyceride; and a processed oil or fat thereof obtained by fractionation, hydrogenation, transesterification, or the like. The edible oil or fat is preferably at least one selected from soybean oil, rapeseed oil, palm-based oil or fat, corn oil, sunflower oil, olive oil, cottonseed oil, and safflower oil. Each of these edible oils or fats may be used alone or in combination. Herein, the palm-based oil or fat refers to a palm oil and a processed palm oil or fat.

The edible oil or fat has a melting point of preferably 10° C. or less, more preferably 0° C. or less. Note that, in this specification, the melting point refers to a rising melting point. The rising melting point can be measured in accordance with Standard Methods for the Analysis of Fats, Oils and Related Materials 2. 2. 4. 2-1996.

A content of the edible oil or fat is usually 70% by mass or more, preferably 85% by mass or more, particularly preferably 95% by mass based on the frying oil or fat composition. Although the upper limit of the content of the edible oil or fat is not particularly set, the total content of the edible oil or fat and the chlorophylls is 100% by mass or less.

Chlorophyll refers to an organic complex in which a tetrapyrrole ring is coordinated on magnesium. Chlorophyll includes many types such as a chlorophyll a and a chlorophyll b depending on a type of the tetrapyrrole ring and a bonded substituent. Pheophytin refers to a chlorophyll in which metals are removed and replaced by two hydrogens. In addition, pyropheophytin refers to a chlorophyll denatured by thermal decomposition. The chlorophylls may be used alone or in combination of two or more types.

An amount of the chlorophylls added to the oil or fat composition is 0.05 ppm by mass or more and 2 ppm by mass or less, preferably 0.07 ppm by mass or more and 1.5 ppm by mass or less, more preferably 0.1 ppm by mass or more and 1 ppm by mass or less. When the addition amount of the chlorophylls is less than 0.05 ppm by mass, the effect of the present invention cannot be obtained. To the contrary, when the addition amount of the chlorophylls is more than 2 ppm by mass, an appearance of the oil or fat is deteriorated. Note that, a concentration of the chlorophylls can be measured by absorption spectrophotometry, fluorometry, or HPLC.

Preferably, the chlorophylls contain at least one selected from a chlorophyll a, a pheophytin a, and a pyropheophytin a. Particularly preferably, the chlorophylls contain the chlorophyll a and the pheophytin a.

A mass ratio of the pheophytin a to the chlorophyll a may be usually 0.1 or more and 2 or less, preferably 0.3 or more and 1.5 or less, particularly preferably 0.5 or more and 1 or less.

The origin of the chlorophylls is not particularly limited. The chlorophylls can be naturally obtained from: algae such as green algae (e.g. *chlorella, euglena*), cyanobacterium, red algae, diatom, and brown algae; a higher plant such as a green and yellow vegetable; and a photosynthetic bacterium such as green bacterium and red bacterium (e.g. Rb. *Sphaeroides*). Preferably, the chlorophylls are derived from algae.

As the chlorophylls, a commercially available product or reagent containing the chlorophylls may be used. Examples of the commercially available product containing the chlorophylls include a product name "NICHINO COLOR G-AO" (derived from *chlorella*, manufactured by Nichino Kagaku Kogyo Co., Ltd.).

The method for adding the chlorophylls to the edible oil or fat is not particularly limited. It is preferable to add the chlorophylls in a form of a chlorophyll-rich solution prepared by previously dissolving the chlorophylls, because addition of the chlorophylls to the edible oil or fat, and homogenization of the chlorophylls with the oil or fat are facilitated.

A solvent for the chlorophyll-rich solution is not particularly limited as long as the chlorophylls are dissolved. The solvent is preferably an edible oil or fat. The edible oil or fat may be used alone or in combination of two or more types. In addition, the solvent for the chlorophyll-rich solution may be the same as or different from the base oil of the frying oil or fat composition.

A lower limit of the concentration of the chlorophylls in the chlorophyll-rich solution is usually 1 ppm by mass or more, preferably 3 ppm by mass or more, particularly preferably 5 ppm by mass or more. A higher limit of the concentration of the chlorophylls in the chlorophyll-rich solution is usually 1,100 ppm by mass or less, preferably 1,000 ppm by mass or less, particularly preferably 900 ppm by mass or less. When the concentration of the chlorophylls is excessively lower than the lower limit, a large amount of the chlorophyll-rich solution is required for obtaining the effect of the present invention. To the contrary, when the concentration of the chlorophylls is excessively higher than the upper limit, it is difficult to manage the concentration of the chlorophylls during preparation of the frying oil or fat composition.

An amount of the chlorophyll-rich solution added to the frying oil or fat composition may be usually 1% by mass or more and 50% by mass or less, preferably 5% by mass or more and 30% by mass or less depending on a concentration of the chlorophylls in the chlorophyll-rich oil.

The frying oil or fat composition can be blended with general-purpose auxiliaries that are added to edible oils or fats unless the effect of the present invention is inhibited. Examples of the auxiliaries include: silicone; an antioxidant such as tocopherol; a flavor; and the like.

The coloration-suppressing effect according to the present invention can be evaluated by the following method, for example.

1. Measurement of Color Tone

A color chromaticity of a test oil or a control oil contained in a Lovibond cell is measured using an automatic Lovibond colorimeter in accordance with AOCS Cc13j-97 at room temperature. From the obtained color chromaticity values Y and R, a color tone (Y+10R) is determined.

2. Calculation of Coloration Suppression Ratio

A coloration suppression ratio of the test oil is calculated from the color tone of the test oil based on the color tone of the control oil in accordance with the following equation.

$$\text{Coloration suppression ratio(\%)} = \qquad [\text{Equation 1}]$$
$$\left\{1 - \frac{\text{Color tone}(Y+10R) \text{ of test oil after frying test}}{\text{Color tone}(Y+10R) \text{ of control oil after frying test}}\right\} \times 100$$

According to the present invention, the coloration suppression ratio based on the control oil containing no chlorophylls is usually 3 to 50% depending on a concentration of the chlorophylls and a foodstuff. This suppressing effect prolongs a usage time of the frying oil or fat composition on the order of 6 to 100%.

Also, the present invention provides a method for suppressing increase in an anisidine value of a frying oil or fat composition, wherein chlorophylls is added to the edible oil or fat in an amount of 0.05 ppm by mass or more and 2 ppm by mass or less.

The edible oil or fat and the chlorophylls used in the method for suppressing increase in the anisidine value are the same as in the coloration suppressing method.

The addition amount of the chlorophylls is preferably 0.07 ppm by mass or more and 1.5 ppm by mass or less, more preferably 0.1 ppm by mass or more and 1.0 ppm by mass or less from the viewpoint of suppression of increase in the anisidine value.

An effect of suppression of increase in the anisidine value according to the present invention can be evaluated in accordance with the following method, for example. Hereinafter, the anisidine value is referred to as AnV in some cases.

1. Measurement of Anisidine Value (AnV)

The AnV is defined as a value of 100 times the extinction coefficient $E^{1\%}_{1\ cm}$ at 350 nm when activating a carbonyl compound with p-anisidine in a sample. An AnV of a test oil after a frying test is measured using a spectrophotometer in accordance with Standard Methods for the Analysis of Fats, Oils and Related Materials 2. 5. 3-2013.

2. Calculation of AnV Increase Suppression Ratio

An AnV increase suppression ratio based on a measurement result of a control oil is calculated in accordance with the following equation.

$$AnV \text{ increase suppression ratio(\%)} = \qquad [\text{Equation 2}]$$
$$\left\{1 - \frac{AnV \text{ of test oil after frying test}}{AnV \text{ of control oil after frying test}}\right\} \times 100$$

According to the present invention, the AnV increase suppression ratio based on the control oil containing no chlorophylls is usually 2 to 30% depending on a concentration of the chlorophylls, a foodstuff, a frying temperature, and the like.

Also, the present invention provides a method for suppressing decrease in an amount of tocopherols in a frying oil or fat composition, characterized in that the chlorophylls are added to an edible oil or fat in an amount of 0.05 ppm by mass or more and 2 ppm by mass or less.

The edible oil or fat and the chlorophylls used in the method for suppressing decrease in the amount of the tocopherols are the same as in the coloration suppressing method.

The addition amount of the chlorophylls is preferably 0.07 ppm by mass or more and 1.5 ppm by mass or less, more preferably 0.1 ppm by mass or more and 1.0 ppm by mass or less from the viewpoint of suppressing decrease in the amount of the tocopherols.

1. Measurement of Tocopherols (Toc)

A test oil blended with an internal standard substance (2,2,5,7,8-pentamethyl-6-hydroxychroman, e.g. manufactured by Wako Pure Chemical Industries, Ltd.) is dissolved in hexane to prepare an analysis sample. Tocopherols in the analysis sample are analyzed by HPLC. A mass ratio of the internal standard substance and each tocopherol is applied to a calibration curve previously prepared by using a vitamin E quantifying standard reagent (e.g. manufactured by Wako Pure Chemical Industries, Ltd.) to quantify the tocopherols in the test oil. The detail measurement condition will be explained in subsequent examples.

2. Calculation of Toc Decrease Suppression Ratio

A Toc decrease suppression ratio of a test oil based on decrease in an amount of Toc in the control oil is calculated in accordance with the following equation.

$$Toc \text{ decrease suppression ratio(\%)} = \qquad [\text{Equation 3}]$$
$$\left\{1 - \frac{\begin{array}{l}(Toc \text{ concentration in test oil before frying test} -\\ Toc \text{ concentration in test oil after frying test})\end{array}}{\begin{array}{l}(Toc \text{ concentration} \\ \text{in control oil before frying test} -\\ Toc \text{ concentration in control oil after frying test})\end{array}}\right\} \times 100$$

According to the present invention, the Toc decrease suppression ratio based on the control oil with no chlorophylls is usually 0.5 to 50% depending on an addition amount of the prepared oil, foodstuffs, a frying temperature, and the like.

Also, the present invention provides a method for producing a frying oil or fat composition, including a step of adding chlorophylls to an edible oil or fat in an amount of 0.05 ppm by mass or more and 2 ppm by mass or less.

The edible oil or fat used in this manufacturing method is the same as in the method for suppressing coloration of the frying oil or fat composition.

Also, the present invention provides a method for producing a fried food, including a step of frying a foodstuff with the frying oil or fat composition obtained by the aforementioned manufacturing method. A frying temperature is usually 140° C. or more and 200° C. or less depending on the foodstuff and a cooking method. Examples of the fried food include deep-fried chicken, croquette, tempura, fried vegetable and fish without coating, cutlet, fritter, friedcake or fried bread, fried noodle, and the like.

Also the present invention provides a stabilizer for the frying oil or fat composition containing the chlorophylls as an active ingredient. The stabilizer is used for suppressing coloration of the frying oil or fat composition, increase in the anisidine value, and/or decrease in the amount of the tocopherols. Specific examples and origins of the frying oil or fat composition and the chlorophylls are as described above.

A carrier (diluent) for the chlorophylls in the stabilizer is the same as the solvent described as an example in the preparation of the chlorophyll-rich solution. The stabilizer may be appropriately blended with auxiliaries such as an antioxidant, an antifoaming agent, an emulsifier, and a flavor. A content of the chlorophylls in the stabilizer is the same as the amount of the chlorophylls added to the chlorophyll-rich solution.

EXAMPLES

The present invention will be explained in more detail by explaining Examples according to the present invention. However, the present invention is not limited to the following Examples. Hereinafter, the chlorophylls are referred to as Chl in some cases.

[Examples 1 and 2] Test of Adding Chlorophylls

1. Preparation of Frying Oil or Fat Composition

As a refined rapeseed oil that is a base oil of the frying oil or fat composition, product name "J Canola Oil" (having chlorophyll (Chl) concentration of 0 ppm by mass and phosphorus content of 0 ppm by mass, manufactured by J-OIL MILLS, Inc.) was prepared. A chlorophyll reagent (product name "Chlorophyll a", "Chlorophyll b", "Pheophytin a", or "Pheophytin b" (each having phosphorus content of 0 ppm by mass, manufactured by Wako Pure Chemical Industries, Ltd.)) was added to this base oil, to prepare a chlorophyll-rich solution. A frying oil or fat composition was prepared by adding the chlorophyll-rich solution to the refined rapeseed oil so as to achieve a Chl concentration presented in Table 1. Hereinafter, the base oil alone is referred to as a control oil, and the oil or fat composition obtained by adding the chlorophylls to the base oil is referred to as a test oil, in some cases.

(Quantification of Phosphorus Content by ICP Emission Spectroscopy)

The test oil was diluted with xylene, and analyzed using ICP emission spectrophotometer (manufactured by Hitachi High-Tech Science Corporation). Additionally, for quantification, CONOSTAN (registered trademark) Oil Analysis Standard (manufactured by SCP SCIENCE) was used.

2. Frying Test and Evaluation

The frying oil or fat composition was subjected to a frying test, and a frying stability of the test oil based on a frying test result of the control oil was evaluated. In evaluation of the frying stability, the test oil and the control oil after the frying test were sampled, and evaluated for a coloration suppression ratio after the frying, an anisidine value increase suppression ratio, and tocopherols decrease suppression ratio. The results are shown in Table 1.

[Frying Test]

First, as a fried food for the frying test, the following processed foods were prepared.

Deep-fried chicken: product name "Wakadori Karaage (GX388)" (manufactured by AJINOMOTO FROZEN FOOD Co., Inc.)

Potato croquette: product name "NEW Potato croquette 60 (GC080)" (about 60 g/piece, manufactured by AJINO-MOTO FROZEN FOOD Co., Inc.)

Into an electric fryer (product name: FM-3HR, manufactured by MACH Electric Cooker), 3.4 kg of test oil or control oil was put, and heated to a frying temperature of 180° C. After heating, the deep-fried chicken or the potato croquette was put into the electric fryer with the following requirements, frying was performed for 10 hours a day, i.e. for a cumulative total time of 30 hours.

[Frying Condition]

[Deep-fried chicken] mass of chicken: 400 g/frying, frying time: 5 minutes/frying, number of frying: once/2 hours (the first to third days)

[Potato croquette] number of croquettes: 5 pieces/frying, frying time: 5 minutes/frying, number of frying: 2 times/day (performed only on the first day)

[Coloration Suppressing Ratio of Oil or Fat Composition after Frying]

1. Measurement of Color Tone

A color chromaticity of a test oil or a control oil contained in a Lovibond cell (W600/OG/1 inch) was measured using an automatic Lovibond colorimeter (Lovibond (registered trademark) PFXi-880, manufactured by Tintometer Ltd.) in accordance with AOCS Cc13j-97 at room temperature. From the obtained color chromaticity values Y and R, a color tone (Y+10R) was determined.

2. Calculation of Coloration Suppression Ratio

A coloration suppression ratio of the test oil was calculated from the color tone of the test oil based on the color tone of the control oil from the color tone of the test oil based on the color tone of the control oil in accordance with the following equation.

[Equation 4]

$$\text{Coloration suppression ratio}(\%) =$$

$$\left\{ 1 - \frac{\text{Color tone } (Y + 10R) \text{ of test oil after frying test}}{\begin{array}{c}\text{Color tone } (Y + 10R) \\ \text{of control oil after frying test}\end{array}} \right\} \times$$

$$100$$

9

[AnV Increase Suppression Ration of Oil or Fat Composition after Frying]

1. Measurement of AnV

An AnV of the test oil after the frying test was measured using an ultraviolet-visible spectrophotometer (product name: "SHIMADZU UV-2450" manufactured by Shimadzu Corporation) in accordance with Standard Methods for the Analysis of Fats, Oils and Related Materials 2. 5. 3-2013.

2. Calculation of AnV Increase Suppression Ratio

An AnV increase suppression ratio of the test oil based on a measurement result of a control oil was calculated in accordance with the following equation.

$$AnV \text{ increase suppression ratio}(\%) = \qquad \text{[Equation 5]}$$
$$\left\{1 - \frac{AnV \text{ of test oil after frying test}}{AnV \text{ of control oil after frying test}}\right\} \times 100$$

[Evaluation of Toc Decrease Suppression Ratio of Oil or Fat Composition after Frying]

1. Measurement of Toc

About 0.2 g of oil and fat, and 1 mL of internal standard substance (2,2,5,7,8-pentamethyl-6-hydroxychroman, e.g. manufactured by Wako Pure Chemical Industries, Ltd.,) were added into a 10 mL measuring flask, which was diluted with hexane in the measuring flask to prepare a sample. Toc in the analysis sample was analyzed by HPLC. Conditions for HPLC are described below.

Column: InertSil (registered trademark) NH2 (2.1 mm×250 mm, 5 μm)

Column temperature: 60° C.

Detector: SHIMADZU fluorescence detector RF-10AXL

10

Detention wavelength: Ex 295 nm, Em 325 nm

Mobile phase: 98% by volume of hexane: 2% by volume of 2-propanol (99% by volume of hexane: 1% by volume of 2-propanol, in a case of analyzing tocotrienol)

Injection volume: 2 μL

Flow rate: 0.5 mL/min

A weight ratio of the internal standard substance and each tocopherol was applied to a calibration curve prepared by using a vitamin E quantifying standard reagent (manufactured by Wako Pure Chemical Industries, Ltd.) to quantify Toc contained in the separated liquid sample. Since a standard reagent for tocotrienol is difficult to obtain, the quantitative value of tocotrienol was calculated using a tocopherol standard reagent.

2. Calculation of Toc Decrease Suppression Ratio

A Toc decrease suppression ratio of a test oil based on decrease in an amount of Toc in the control oil is calculated in accordance with the following equation.

$$Toc \text{ decrease suppression ratio}(\%) = \qquad \text{[Equation 6]}$$
$$\left\{1 - \frac{\begin{pmatrix} Toc \text{ concentration in test oil before frying test} - \\ Toc \text{ concentration in test oil after frying test} \end{pmatrix}}{\begin{pmatrix} Toc \text{ concentration} \\ \text{in control oil before frying test} - \\ Toc \text{ concentration in control oil after frying test} \end{pmatrix}}\right\} \times 100$$

TABLE 1

| | Raw material | | Calculated value for Oil or fat composition | | |
| --- | --- | --- | --- | --- | --- |
| | composition of Oil or fat composition | | Chl Concen- | | Phosphorus Content |
| | Base Oil | Chlorophyll Reagent | tration (mass ppm) | | (mass ppm) |
| Comparative Example 1 | Refined Rapeseed | — | — | | — |
| Example 1 | Oil | Chlorophyll a | 0.168 | Total | 0 |
| | | Chlorophyll b | 0.041 | 0.209 | |
| Example 2 | | Pheophytin a | 0.210 | Total | 0 |
| | | Pheophytin b | 0.045 | 0.255 | |

| | Evaluation from Frying test | | | | | | |
| --- | --- | --- | --- | --- | --- | --- | --- |
| | Color Tone | | | | Toc | | |
| | (Y + 10R) | | | | Concen- | Concen- | |
| | | Color- | AnV | | tration | tration | |
| | Analysis Value After Frying Test | ation Suppres- sion Ratio (%) | Analysis Value After Frying Test | Increase Suppres- sion Ratio (%) | Before Frying Test (mass ppm) | After Frying Test (mass ppm) | Decrease Suppres- sion Ratio (%) |
| Comparative Example 1 | 62 | — | 68.8 | — | 714.4 | 533.4 | — |
| Example 1 | 52 | 16.1 | 63.5 | 7.6 | 716.9 | 558.1 | 12.3 |
| Example 2 | 50 | 19.4 | 64.2 | 6.7 | 719.9 | 563.0 | 13.3 |

A color tone (Y+10R) of the control oil after subjected to the frying test for 30 hours was 62 as shown in Table 1 (Comparative Example 1). On the other hand, color tones of the test oils prepared by adding 0.209 ppm by mass or 0.255 ppm by mass of chlorophylls to the same control oil were 52 and 50 respectively after the frying test (Examples 1 and 2). Colorations of the test oils during frying were suppressed by 16.1% and 19.4% respectively based on the control oil. As described above, the chlorophylls added to the test oils were proved to exhibit an effect of suppressing coloration of the oil or fat composition when used for frying.

The AnV of the control oil subjected to the frying test for 30 hours was 68.8 as shown in Table 1 (Comparative Example 1). On the other hand, the AnVs of the test oils prepared by adding the chlorophylls to the same control oil were 63.5 and 64.2 after the frying test. Increases in the AnVs of the test oils during frying were suppressed by 7.6% and 6.7% respectively based on the control oil. The chlorophylls added to the test oils were proved to have an action of suppressing increase in the AnV of the oil or fat composition when used for frying.

As shown in Table 1, the content of Toc in the control oil was 714.4 ppm by mass, but, after the frying test for 30 hours, the content decreased to 533.4 ppm by mass (Comparative Example 1). On the other hand, in Examples 1 and 2, after the frying test, the contents of Toc in the test oils prepared by adding the chlorophylls to the same control oil were 558.1 ppm by mass and 563.0 ppm by mass respectively. Decreases in Toc in the test oils during frying were suppressed by 12.3% and 13.3% respectively based on the control oil. The chlorophylls added to the test oils were proved to have an action of suppressing the decrease in the Toc content when the oil or fat was used for frying.

[Examples 3 and 4] Test of Adding Chlorophyll-Rich Solution

1. Preparation of Frying Oil or Fat Composition

The chlorophyll compound to be added to the control oil in Example 1 was changed to a commercially available pigment. Two lots of commercially available pigments (product name "NICHINO COLOR G-AO", manufactured by Nichino Kagakukogyo Co., Ltd.) were prepared (hereinafter, each lot is referred to as a pigment (1) and a pigment (2)). A phosphorus content in the pigment (1) was 8,386 ppm by mass in accordance with measurement by ICP emission spectrometry.

The pigment (1) or (2) was added to a base oil (the aforementioned refined rapeseed oil) to prepare a chlorophyll-rich solution. A Chl concentration in this chlorophyll-rich oil was measured in accordance with the following method. The results are shown in Table 3.

A frying oil or fat composition was prepared by adding the chlorophyll-rich solution to the refined rapeseed oil, as described in Table 4. The Chl concentration and the phosphorus content in the frying oil or fat composition were calculated from the Chl content and phosphorus content in the chlorophyll-rich solution, and an amount of the chlorophyll-rich solution added to the base oil. These results are shown in Table 4.

2. Measurement of Chl Concentration in Chlorophyll-Rich Solution

The Chl concentration in the chlorophyll-rich solution was measured by HPLC. Calibration curves were prepared for quantifying the chlorophylls. For the calibration curves, the chlorophylls a and b, and the pheophytins a and b (all of them are manufactured by Wako Pure Chemical Industries, Ltd.) were used. Note that, since a reference standard of pyropheophytin is difficult to obtain, calibration curves were prepared using the pheophytins a and b instead of the pyropheophytins a and b respectively.

First, an internal standard solution was prepared by dissolving zinc phthalocyanine (Wako Pure Chemical Industries, Ltd.) in an amount of 0.75 mg/mL as an internal standard substance into tetrahydrofuran. A prescribed amount of chlorophyll a, chlorophyll b, pheophytin a, and pheophytin b was dissolved in acetone, then diluted with a refined rapeseed oil to prepare each sample for the calibration curve measurement. 0.2 g of sample for the calibration curve measurement and 100 μL of internal standard solution were mixed in 2 mL of acetone to prepare an HPLC analysis sample. The HPLC analysis sample was analyzed by HPLC under the following conditions to prepare each calibration curve.

[Conditions for HPLC]
    Detector: fluorescence detector RF-20A XS
    Column: SHISEIDO CAPCELL PAK C18 (4.6 mm×250 mm, 5 μm)
    Column temperature: 40° C.
    Mobile phase A: acetone
    Mobile phase B: methanol:water=87:13 (v:v)
    Gradient condition: shown in Table 2
    Injection volume: 10 μL
    Flow rate: 1.0 mL/min

TABLE 2

| Gradient Condition | |
| --- | --- |
| Minutes | Ratio of Mobile Phase B (volume %) |
| 0-10.0 | 90 → 45 |
| 10.0-25.0 | 45 → 45 |
| 25.0-45.0 | 45 → 1 |
| 45.0-55.0 | 1 → 1 |
| 55.0-55.1 | 1 → 90 |
| 55.1-65.0 | 90 → 90 |

[Conditions for Detection]
A combination of the following two wavelengths: an excitation wavelength (Ex) and a measurement wavelength (Em) was adopted for measuring an a body and a b body of the chlorophylls with high sensitivity.
    [Channel 1] Ex: 404 nm, Em: 670 nm
    [Channel 2] Ex: 440 nm, Em: 650 nm
    The channel 1 is highly sensitive to the a body of the chlorophylls, and the channel 2 is highly sensitive to the b body of the chlorophylls.

Next, 0.2 g of the chlorophyll-rich solution prepared by diluting a commercially available pigment in the refined rapeseed oil, and 100 μL of internal standard solution were mixed in 2 mL of acetone to prepare a sample, and the sample was subjected to an HPLC analysis under the above conditions. Note that, each chlorophyll-rich solution of the pigment (1) and the pigment (2) was prepared by diluting 0.0699 g of pigment (1) or 0.0665 g of pigment (2) in 200.7 g or 202.17 g respectively of refined rapeseed oil. The results of measuring the chlorophyll-rich solutions are applied to the calibration curves to determine Chl concentrations in the chlorophyll-rich solution. Note that, in Table 3, the chlorophyll concentration (ppm by mass) lower than a measurement limit was represented by "0".

As shown in Table 3, the pigment (1) was composed of the a body of the chlorophylls, and on the other hand, the pigment (2) was a mixture of the a body and the b body of the chlorophylls. In addition, a mass ratio of the pheophytin a to the chlorophyll a in the pigment (1) was higher than in the pigment (2).

TABLE 3

| | Pigment (1) | | Pigment (2) | |
|---|---|---|---|---|
| | Concen-tration (mass ppm) | Compo-sition Ratio (%) | Concen-tration (mass ppm) | Compo-sition Ratio (%) |
| Chlorophyll a | 2.09 | 39.6 | 2.06 | 33.2 |
| Chlorophyll b | 0 | 0 | 2.17 | 35.0 |
| Pheophytin a | 2.02 | 38.3 | 1.18 | 19.1 |
| Pheophytin b | 0 | 0 | 0 | 0 |
| Pyropheophytin a | 1.17 | 22.2 | 0.76 | 12.2 |
| Pyropheophytin b | 0 | 0 | 0.03 | 0.4 |
| Total | 5.28 | 100.1 | 6.20 | 99.9 |
| Pheophytin a/ Chlorophyll a Ratio | 0.97 | | 0.57 | |

3. Frying Test and Evaluation

A frying test and evaluation were performed by the same operation as in Example 1 except for the following points. The results are shown in Table 4.

Into an electric fryer (product name: FM-3HR, manufactured by MACH Electric Cooker), 3.4 kg of test oil or control oil was put, and heated to a frying temperature of 180° C. After heating, the deep-fried chicken or the potato croquette was put into the electric fryer with the following requirements, frying was performed for 8 hours a day, i.e. for a cumulative total time of 40 hours.

[Frying Condition]

[Deep-fried chicken] mass of chicken: 400 g/frying, frying time: 5 minutes/frying, number of frying: 5 times/day (the first to fifth days)

[Potato croquette] number of croquettes: 5 pieces/frying, frying time: 5 minutes/frying, number of frying: 2 times/day (performed on the first day and the fourth day)

In evaluation of the coloration suppression ratio, a ½ inch cell was used as the Lovibond cell.

TABLE 4

| | | Raw material composition of Oil or fat composition | | | | Calculated value for Oil or | |
|---|---|---|---|---|---|---|---|
| | | | Chlorophyll-rich Solution | | | fat composition | |
| | Base Oil | Feed-stock | Chl Concen-tration (mass ppm) | Addition Amount (mass %) | | Chl Concen-tration (mass ppm) | Phosphorus Content (mass ppm) |
| Comparative Example 2 | Refined Rapeseed | — | — | — | | — | — |
| Comparative Example 3 | Oil | Pigment (1) | 5.28 | 0.27 | | 0.014 | 0.01 |
| Example 3 | | | 5.28 | 2.46 | | 0.130 | 0.07 |
| Comparative Example 4 | Refined Rapeseed | — | — | — | | — | — |
| Example 4 | Oil | Pigment (2) | 6.19 | 1.41 | | 0.087 | Unmeasured |

| | Evaluation from Frying test | | | | | | |
|---|---|---|---|---|---|---|---|
| | Color Tone | | | | Toc | | |
| | (Y + 10R) | | | | Concen-tration | Concen-tration | |
| | | Color-ation | AnV | | Before | After | |
| | Analysis Value After Frying Test | Suppres-sion Ratio (%) | Analysis Value After Frying Test | Increase Suppres-sion Ratio (%) | Frying Test (mass ppm) | Frying Test (mass ppm) | Decrease Suppres-sion Ratio (%) |
| Comparative Example 2 | 63 | — | 94.5 | — | 709.0 | 391.0 | — |
| Comparative Example 3 | 61 | 3.2 | 91.1 | 3.6 | 697.3 | 344.3 | −11.0 |
| Example 3 | 46 | 27.0 | 87.1 | 7.8 | 694.9 | 419.6 | 13.4 |
| Comparative Example 4 | 52 | — | 82.3 | — | 676.0 | 375.7 | — |
| Example 4 | 36 | 30.8 | 65.3 | 20.7 | 667.9 | 438.6 | 23.7 |

As described in Examples 3 and 4, even when using a commercially available pigment as the chlorophylls, all of coloration, increase in the AnV, and decrease in the amount of the Toc were suppressed as in Example 1. However, in a case that the concentration of Chl added to the oil or fat composition was 0.014 ppm by mass as in Comparative Example 3, decrease in the amount of the Toc was not suppressed. When the concentration of Chl added to the oil or fat composition was 0.087 ppm by mass or more, an effect was observed.

[Examples 5 to 8] Test of Changing Concentration of Chl Added to Oil or Fat Composition Using the pigment (1), a chlorophyll-rich solution was prepared so as to have a Chl concentration described in Table 5. As shown in Table 5, each oil or fat composition was prepared in the same procedure as in Example 3 except that the chlorophyll-rich solution used and the addition amount of the chlorophyll-rich solution were changed.

These oil or fat compositions were subjected to the frying test and evaluation in the same procedure as in Example 3. The results are shown in Table 5. Although the Chl concentration was as low as 0.07 ppm by mass, the coloration suppression ratios and the Toc decrease suppression ratios of the test oils after frying are 20% or more. To raise the AnV increase suppression ratio to 10% or more a Chl concentration of 0.2 ppm by mass or more is required.

TABLE 5

| | Raw material composition of Oil or fat composition | | | | Calculated value for Oil or fat composition | |
| | | Chlorophyll-rich Solution | | | | |
| | Base Oil | Feed-stock | Chl Concen-tration (mass ppm) | Addition Amount (mass %) | Chl Concen-tration (mass ppm) | Phosphorus Content (mass ppm) |
|---|---|---|---|---|---|---|
| Comparative Example 5 | Refined Rapeseed Oil | — | — | — | — | — |
| Example 5 | | Pigment (1) | 5.13 | 1.38 | 0.071 | 0.04 |
| Example 6 | | | 5.13 | 2.23 | 0.114 | 0.07 |
| Example 7 | | | 4.68 | 4.33 | 0.203 | 0.13 |
| Example 8 | | | 4.68 | 29.68 | 1.389 | 0.87 |

| | Evaluation from Frying test | | | | | | |
| | Color Tone | | | | Toc | | |
| | (Y + 10R) | | AnV | | Concen-tration | Concen-tration | |
| | Analysis Value After Frying Test | Color-ation Suppres-sion Ratio (%) | Analysis Value After Frying Test | Increase Suppres-sion Ratio (%) | Before Frying Test (mass ppm) | After Frying Test (mass ppm) | Decrease Suppres-sion Ratio (%) |
|---|---|---|---|---|---|---|---|
| Comparative Example 5 | 67 | — | 96.7 | — | 678.4 | 318.7 | — |
| Example 5 | 51 | 23.9 | 88.2 | 8.9 | 671.6 | 390.7 | 21.9 |
| Example 6 | 38 | 43.3 | 90.6 | 6.3 | 660.5 | 421.7 | 33.6 |
| Example 7 | 40 | 40.3 | 82.3 | 14.9 | 680.8 | 431.7 | 30.7 |
| Example 8 | 41 | 38.8 | 74.9 | 22.6 | 641.4 | 426.4 | 40.2 |

[Example 9] Test of Changing Base Oil (1)

A chlorophyll-rich solution was prepared so as to have a Chl concentration described in Table 6 using the pigment (1) and a refined soybean oil (product name "J Soybean Shi-rashime (refined) Oil", (having Chl concentration of 0 ppm by mass and phosphorus content of 0 ppm by mass, manu-factured by J-OIL MILLS, Inc.)). As shown in Table 6, each oil or fat composition was prepared in the same procedure as in Example 3 except that the addition amount of the chlorophyll-rich solution used was changed and the base oil was changed to a refined soybean oil. These oil or fat compositions were subjected to a frying test and evaluation in the same procedure as in Example 3 except that a 1 inch cell was used as the Lovibond cell. The results are shown in Table 6.

As shown in Table 6, even when changing the base oil to the soybean oil, an effect of the present invention on the coloration, and the suppression ratios of AnV increase and Toc decrease was obtained.

TABLE 6

| | Raw material composition of Oil or fat composition | | | | Calculated value for Oil or fat composition | |
| | | Chlorophyll-rich Solution | | | | |
| | Base Oil | Feed-stock | Chl Concen-tration (mass ppm) | Addition Amount (mass %) | Chl Concen-tration (mass ppm) | Phosphorus Content (mass ppm) |
|---|---|---|---|---|---|---|
| Comparative Example 6 | Refined Soybean Oil | — | — | — | — | — |
| Example 9 | | Pigment (1) | 6.10 | 2.32 | 0.141 | 0.07 |

| | Evaluation from Frying test | | | | | | |
| | Color Tone | | | | Toc | | |
| | (Y + 10R) | | | | | | |
| | | Color-ation | AnV | | Concen-tration | Concen-tration | |
| | Analysis Value After Frying Test | Suppres-sion Ratio (%) | Analysis Value After Frying Test | Increase Suppres-sion Ratio (%) | Before Frying Test (mass ppm) | After Frying Test (mass ppm) | Decrease Suppres-sion Ratio (%) |
|---|---|---|---|---|---|---|---|
| Comparative Example 6 | 95 | — | 105.0 | — | 1142.2 | 716.8 | — |
| Example 9 | 53 | 44.2 | 94.2 | 10.3 | 1139.1 | 816.1 | 24.1 |

[Example 10] Test of Changing Base Oil (2)

A chlorophyll-rich solution was prepared so as to have a Chl concentration described in Table 7 using the pigment (1) and a refined palm olein (product name "Frying Oil J" (palm olein, having iodine value of 67, Chl concentration of 0 ppm by mass, and phosphorus content of 0 ppm by mass, manufactured by J-OIL MILLS, Inc.)). As shown in Table 7, each oil or fat composition was prepared in the same procedure as in Example 3 except that the addition amount of the chlorophyll-rich solution used was changed and the base oil was changed to a palm olein. A frying test and evaluation was carried out in the same procedure as in Example 3 except a frying condition described below, that a 1 inch cell was used as the Lovibond cell, and that an analysis value of α, β, γ and δ-tocotrienol was used for calculating the Toc decrease suppression ratio. The results are shown in Table 7.

Into an electric fryer (product name: FM-3HR, manufactured by MACH Electric Cooker), 3.4 kg of test oil or control oil was put, and heated to a frying temperature of 180° C. After heating, the deep-fried chicken or the potato croquette was put into the electric fryer with the following requirements, frying was performed for 8 hours a day, i.e. for a cumulative total time of 24 hours.

[Frying Conditions]

[Deep-fried chicken] mass of chicken: 400 g/frying, frying time: 5 minutes/frying, number of frying: 5 times/day (the first to third days)

[Potato croquette] number of croquettes: 5 pieces/frying, frying time: 5 minutes/frying, number of frying: 2 times/day (performed only on the first day)

As shown in Table 7, even when changing the base oil to the palm olein, an effect of the present invention on the coloration, and the suppression ratios of AnV increase and Toc decrease was obtained. When comparing Examples 6, 9 and 10, the base oil is preferably rapeseed oil and soybean oil in terms of the coloration suppression ratio. In terms of the AnV increase suppression ratio, the base oil is preferably rapeseed oil and soybean oil, more preferably soybean oil. In terms of the Toc decrease suppression ratio, the base oil is preferably rapeseed oil and soybean oil, more preferably rapeseed oil.

TABLE 7

| | Raw material composition of Oil or fat composition | | | Calculated value for Oil or fat composition | |
| | | Chlorophyll-rich Solution | | fat composition | |
| | Base Oil | Feedstock | Chl Concentration (mass ppm) | Addition Amount (mass %) | Chl Concentration (mass ppm) | Phosphorus Content (mass ppm) |
| --- | --- | --- | --- | --- | --- | --- |
| Comparative Example 7 | Refined Palm Olein | — | — | — | — | — |
| Example 10 | | Pigment (1) | 6.19 | 1.72 | 0.106 | 0.05 |

| | Evaluation from Frying test | | | | | | |
| | Color Tone | | | | Toc | | |
| | (Y + 10R) | | AnV | | Concentration | Concentration | |
| | Analysis Value After Frying Test | Coloration Suppression Ratio (%) | Analysis Value After Frying Test | Increase Suppression Ratio (%) | Before Frying Test (mass ppm) | After Frying Test (mass ppm) | Decrease Suppression Ratio (%) |
| --- | --- | --- | --- | --- | --- | --- | --- |
| Comparative Example 7 | 69 | — | 59.0 | — | 502.8 | 207.7 | — |
| Example 10 | 55 | 20.3 | 57.4 | 2.8 | 483.3 | 203.7 | 5.3 |

The invention claimed is:

1. A method for suppressing coloration of an oil composition, comprising:

adding chlorophylls to rapeseed oil in an amount of 0.071 ppm by mass or more and 1.389 ppm by mass or less measured by HPLC to obtain the oil composition; and heating the oil composition at a temperature of 140° C. or more and 200° C. or less, wherein the oil composition comprises the rapeseed oil edible oil or fat and the chlorophylls, and the coloration of the oil composition after being heated at the temperature of 140° C. or more and 200° C. or less is suppressed compared to a control oil consisting of the rapeseed oil after being heated at the temperature of 140° C. or more and 200° C. or less.

2. The method for suppressing as claimed in claim 1, wherein the chlorophylls are added as a chlorophyll-rich solution having a chlorophyll concentration of 1 ppm by mass or more and 1,000 ppm by mass or less.

3. The method for suppressing as claimed in claim 1, wherein the chlorophylls contain at least one selected from a chlorophyll a, a pheophytin a, and a pyropheophytin a.

4. The method for suppressing as claimed in claim 3, wherein the chlorophylls contain the chlorophyll a and the pheophytin a.

5. The method for suppressing as claimed in claim 4, wherein a mass ratio of the pheophytin a to the chlorophyll a is 0.3 or more and 1.5 or less.

6. The method for suppressing as claimed in claim 1, wherein the chlorophylls are derived from algae.

7. A method for suppressing increase in an anisidine value of an oil composition, comprising:

adding chlorophylls to rapeseed oil in an amount of 0.071 ppm by mass or more and 1.389 ppm by mass or less measured by HPLC to obtain the oil composition; and heating the oil composition at a temperature of 140° C. or more and 200° C. or less, wherein the oil composition comprises the rapeseed oil and the chlorophylls, and the anisidine value of the oil composition after being heated at the temperature of 140° C. or more and 200° C. or less is suppressed compared to the anisidine value of a control oil consisting of the rapeseed oil after being heated at the temperature of 140° C. or more and 200° C. or less.

8. A method for suppressing decrease in an amount of tocopherols in an oil composition, comprising:

adding chlorophylls to rapeseed oil in an amount of 0.071 ppm by mass or more and 1.389 ppm by mass or less measured by HPLC to obtain the oil composition; and heating the oil composition at a temperature of 140° C. or more and 200° C. or less, wherein the oil composition comprises the rapeseed oil and the chlorophylls, and the decrease in the amount of tocopherols in the oil composition after being heated at the temperature of 140° C. or more and 200° C. or less is suppressed compared to decrease in the amount of tocopherols in a control oil consisting of the rapeseed oil after being heated at the temperature of 140° C. or more and 200° C. or less.

* * * * *